3,692,183

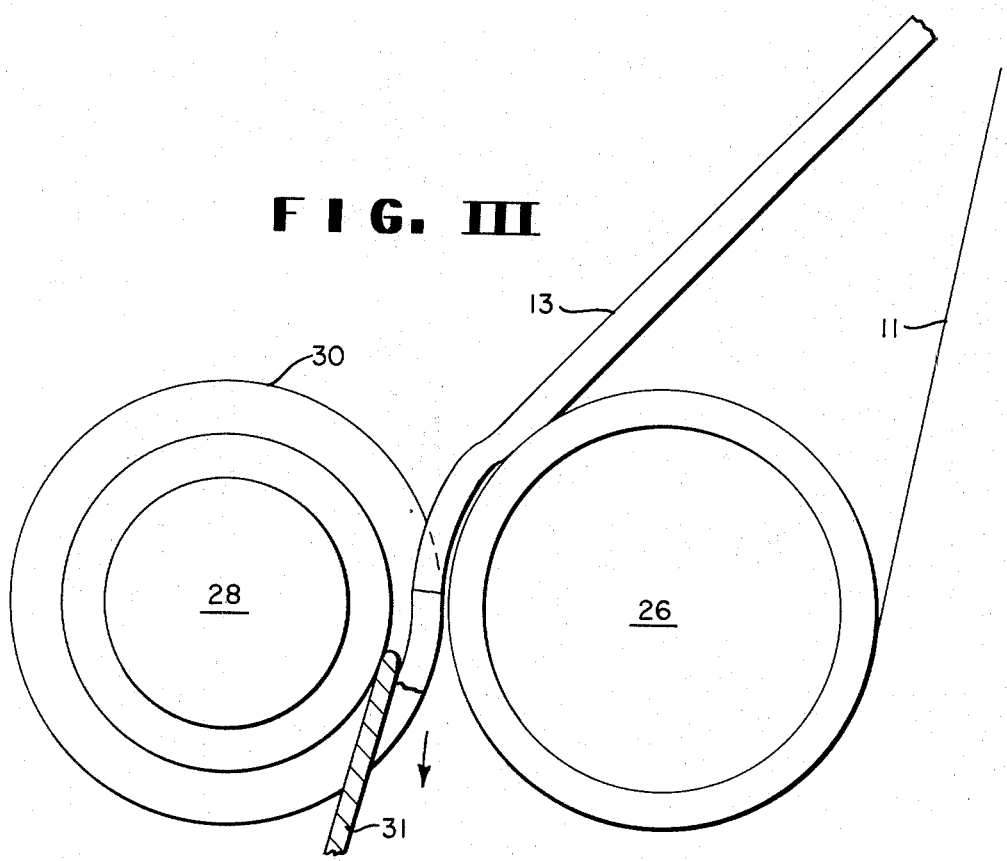
FIG. III
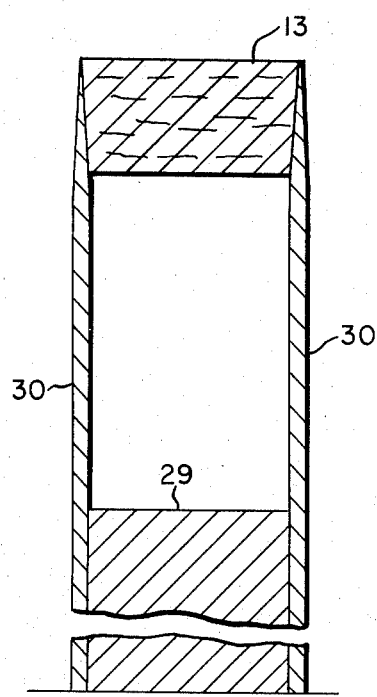
FIG. IV
INVENTOR
WILBUR L. PATTON
BY Donald A. Hoes
ATTORNEY

INVENTOR.
JOSEF TRÄ
BY

FILTER FOR CLEANING SUSPENSIONS

The invention relates to a filter particularly for the cleaning of suspensions, especially fiber suspensions such as are employed in the manufacture of paper and cardboard.

Filters of the nature referred to are known and generally comprise having a rotationally symmetrical, preferably cylindrical, screen, through which the suspension flows, and a housing surrounding said screen. The housing is provided with inlet means for the suspension to be cleaned, and with separate discharge means for the cleaned suspension and for the impurities retained by the screen. Strips are provided in the housing extending substantially parallel to the axis of the screen and are adapted to rotate on the said axis and along the surface of the screen for detaching solid substances filtered from the suspension and deposited on the screen.

Such filters are preferred, and are widely used, for the cleaning of fiber suspensions which are used in the manufacture of paper, board, and the like. The housing of such a filter, and the suspension pipelines connected thereto, are usually constructed in totally enclosed form so that the suspension can be fed into the filter and then transferred to the stock inlet of the papermaking machine under conditions in which air is excluded and at a pressure which is higher then atmospheric pressure.

A known filter of the general type referred to is disclosed in U. S. Pat. No. 2,835,173. The filter of the patent has a vertically disposed cylindrical screen and is provided with two strips which are relatively offset by 180° and which are adapted to rotate along the internal wall of the screen and extend over the entire height thereof. With this construction of the filter it is frequently found that pulsating pressure surges, generated by the rotating strips, are transmitted through the ducts or pipelines for the cleaned suspension and are propagated as far as the stock inlet where they cause interference with the forming of the web, for example by resulting in periodic fluctuations of the paper web thickness.

Attempts have been made to eliminate this disadvantage by reinforcing the mounting of the pipelines and of the stock inlet on the machine foundation in order to avoid sympathetic vibration of structural components of the machine which increase the pressure pulses still further. Further, the frequency of the pressure pulses was increased by increasing the number of strips, because it was hoped that, as a result, the frequency of the pressure surges would be higher than the natural frequency of the pipelines and of the stock inlet walls, which would thus no longer be excited into sympathetic vibrations. However, in many cases these efforts did not provide the desired success, in particular because there are limits to the increase that can be made in the number of strips because an excessive number of strips reduces the free surface area of the screen to such an extent that the throughput of the filter is substantially reduced.

It is, therefore, the object of the invention to develop a filter of the type described in which the pressure surges generated by the strips for cleaning the screen will no longer disturb the formation of the sheets on the paper making machine.

SUMMARY OF THE INVENTION

The problem described above is solved, according to the present invention, by constructing the strips which move along the screen surface in sections with the sections of a respective blade offset in the circumferential direction.

A single strip section of the filter constructed in accordance with the invention therefore extends only over part of the length or height of the screen, for example over half the screen length. Accordingly, it is possible for four strip sections, offset by about 90° relative to each other, to be disposed in the axial zone of one screen half and for four further strip sections, offset by about 45° relative to the first mentioned strip sections, to be disposed in the axial zone of the other screen half. In this way, the stock inlet pressure pulses produced by the movement of the strip sections along the screen surface will have a lower intensity than those produced by strips extending over the entire length or height of the screen. Moreover, because of the larger number of strip sections, it is possible for the frequency of the pressure pulses to be increased to a far greater extent than is possible with filters of conventional construction and without having to tolerate any reduction of the throughput of the filter, since the circumferential length of all strip sections and, therefore, the free screen surface area remains substantially unchanged.

The conditions described hereinbefore co-operate with each other so that the pressure pulses are no longer significant and do not produce any disturbing fluctuations of the sheet thickness when the web is formed in the paper making machine. The effect of an increase in the frequency of the pressure pulsations is apparently to make the thicker or thinner sections previously appearing in the finished paper web occur at such short intervals that they no longer represent any disturbing irregularities. Moreover, the frequency of the pressure pulsation in all cases is substantially higher than the natural frequency of the pipelines and stock inlet walls so that any sympathetic vibration of these parts is substantially avoided.

If the individual strip sections are each provided with only a single supporting arm for connecting them to the supporting rotor shaft and preferably at one of their ends (to avoid dead corners in which dirt and fiber material may remain deposited), the construction according to the invention will offer the additional advantage that, in operation, the relatively short strip sections are subject to substantially less deformation due to the effect of centrifugal force than in known filters in which the strips extend over the entire height of the screen.

The invention may be advantageously improved by offsetting the strip sections relative to each other by different angular amounts in the circumferential direction. This results in disharmony of the oscillating system formed by the pipelines and parts of the stock inlet so that sympathetic vibration of such parts can be avoided with an even greater degree of reliability.

A preferred embodiment of the invention is described in the following detailed specification with reference to the drawings in which.

DETAILED DESCRIPTION OF THE INVENTION

Figure 1:
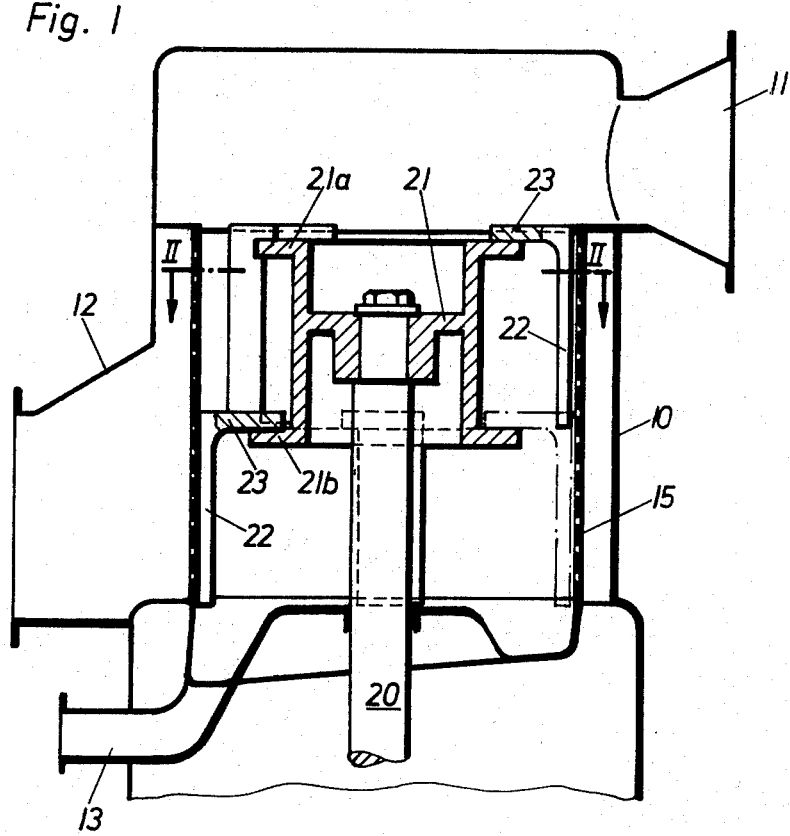
FIG. 1 is a vertical longitudinal section through a filter according to the present invention and is indicated by section line I—I on FIG. 2.

The filter illustrated in the drawing is provided with a closed housing 10 having an inlet connection 11 for the suspension to be cleaned, a discharge connection 12 for the cleaned suspension and a discharge pipe 13 for the impurities screen out from the suspension. A cylindrical screen 15 having a vertical axis is disposed within the housing 10 in such a manner that the suspension to be cleaned enters the interior of the screen at the open upper end of the cylinder. The cleaned suspension passes radially outwardly through apertures of the screen from the interior of the screen to the exterior thereof while impurities stopped by the screen sink downwardly toward the open lower end of the screen.

A rotor is provided coaxially within the screen 15 for the continuous detachment of solids from the screen, such as fiber material and/or impurities which are stopped by and deposited on the screen. The rotor comprises a shaft 20 on the screen axis, a flanged hub 21 fixed to the shaft, and a plurality of axial strip sections 22, mounted on the flanged hub and having a length which is approximately equal to half the height of the screen 15. The shaft 20 is supported outside the housing 10 by conventional bearings not shown in the drawing and is driven by conventional driving elements which are also not shown.

The flanged hub 21 has two flanges 21a at the top and 21b at the bottom which are concentric with the rotor axis and of which one is disposed in the zone of the upper inlet end of the screen 15 and the other at about half the height of the screen, namely, about the middle of the screen.

One supporting arm 23 is integrally formed on each of the strip sections 22 for securing the strip section to respective ones of the flanges 21a, 21b. In the illustrated embodiment, four strip sections 22, each covering half the height of the screen 15, are disposed on each flange. The angular distances between the strip sections in the circumferential direction are different within the two screen halves as well as within adjacent strip sections in both screen halves; these distances vary between 35° and 55°.

In a contemplated modification, the length of the strip sections may also amount to only, for example, one third of the screen height. In this case, the flanged hub is provided with three flanges for mounting the strip sections. Furthermore, the number of strip sections provide on one flange may vary in accordance with the size of the filter. Finally instead of extending in parallel to the axis of rotation, the strips may also be disposed so that they are inclined in known manner relative to the axis of rotation, preferably so that the lower ends trail behind the upper ends during rotation of the rotor.

Figure 2:
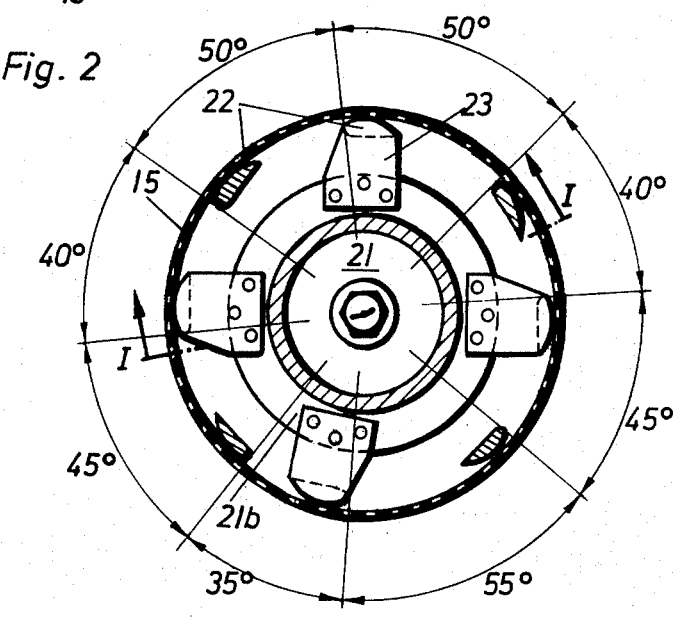
FIG 2 is a transverse cross section through the screen and the rotor of the filter and is indicated by section line II—II on FIG. 1.

FIG. 2 shows the angular spacing between the sections of the strips in each axial zone of the filter screen as well as the angular displacement of the sections in one axial zone of the screen from those in the other axial zone of the screen. It will be noted that the sections in each axial zone of the screen are nonuniformly angularly spaced and in respectively different manners. The nonuniformity of the spacing of the sections assists in reducing pressure pulsations in the fluid being filtered of a type which could develop sympathetic vibrations in the pipelines leading to the stock inlet of the supplied paper making machine, or in the walls of the stock inlet.

The strips have been shown as being made up of two sections each but it will be evident that each strip could be formed into a greater number of sections if so desired. Also, while the strips are shown as axial elements, it is possible to incline the strips to the vertical in the circumferential direction, if desired. Axial strips are preferred because they can be simply made as straight members. Still further, the screen is shown as a cylinder but it could be in the form of a different surface of revolution such as frusto-conical, if so desired.

Modifications may be made within the purview of the appended claims.

What is claimed is:

1. In a filter for fluids such as suspensions:
a housing, a screen in such housing symmetrical about a vertical central axis and open at the ends, the ends of said screen engaging said housing and dividing the interior of said housing into an inlet chamber inside said screen and an outlet chamber outside said screen, inlet means communicating with said inlet chamber at the top of said screen, first outlet means communicating with said outlet chamber, fluid to be filtered flowing radially outwardly through said screen, said housing having a space therein at the bottom communicating with the open lower end of said screen and second outlet means leading from said space, circumferentially spaced strip-like elements extending along the inside surface of said screen in the direction from one end of the screen to the other and rotatable about said axis for detaching deposits from the inside surface of said screen, said deposits migrating toward said space when dislodged from said screen for discharge therefrom via said second outlet means, each said element being formed in axial sections, said sections of each element being offset in the circumferential direction from each other, a common support to which said sections are fixed, and means for rotating said support.

2. A filter according to claim 1 in which said strip-like elements are circumferentially spaced from each other different angular amounts.

3. A filter according to claim 1 in which said screen is cylindrical.

4. A filter according to claim 1 in which said strip-like elements extend parallel to the central axis of said screen.

5. A filter according to claim 1 in which said means for rotating said support comprises a shaft coaxial with said central axis of said screen, said support comprising a hub on said shaft, axially spaced flanges on said hub, and each said section having supporting arm means thereon extending inwardly to and fixed to a respective flange of said hub.

6. A filter according to claim 5 in which the said arm means for each section is in the form of a single arm at one end of the respective section.

7. A filter according to claim 1 in which the said sections of each said strip-like element are disposed in respective axial zones of said screen, the said sections in each said zone being non-uniformly circumferentially spaced, and the said sections in one zone having different circumferential spacing from the said sections of another said zone.

8. A filter according to claim 7 in which the angular spacing between the said strip-like elements in respective zones of said screen is from about 80° to about 100° while the angular offset between respective sections of each strip-like element is from about 35° to about 55°.

* * * * *